United States Patent
Zee et al.

(10) Patent No.: US 9,265,013 B2
(45) Date of Patent: Feb. 16, 2016

(54) METHODS AND ARRANGEMENTS FOR SCHEDULING BASED ON POWER CONSUMPTION

(75) Inventors: Oscar Zee, Stockholm (SE); Lars Klockar, Stockholm (SE); Håkan Olofsson, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 473 days.

(21) Appl. No.: 13/502,848

(22) PCT Filed: Apr. 16, 2010

(86) PCT No.: PCT/EP2010/055018
§ 371 (c)(1),
(2), (4) Date: Apr. 19, 2012

(87) PCT Pub. No.: WO2011/047885
PCT Pub. Date: Apr. 28, 2011

(65) Prior Publication Data
US 2012/0213139 A1 Aug. 23, 2012

Related U.S. Application Data

(60) Provisional application No. 61/253,960, filed on Oct. 22, 2009.

(51) Int. Cl.
*H04W 52/02* (2009.01)
*H04W 52/28* (2009.01)
(Continued)

(52) U.S. Cl.
CPC ............ *H04W 52/281* (2013.01); *H04W 52/26* (2013.01); *H04W 72/1257* (2013.01); *H04W 52/367* (2013.01); *H04W 52/44* (2013.01); *H04W 72/1252* (2013.01); *Y02B 60/50* (2013.01)

(58) Field of Classification Search
CPC ..... H04W 52/00; H04W 72/08; H04W 16/08; H04W 28/0289; H04W 72/0473; H04W 72/1252; H04W 72/1263; H04W 52/02; H04W 52/04; H04W 52/06; H04W 52/08; H04W 52/10; H04W 52/12; H04W 52/30; H04W 52/32; H04W 52/322; H04W 52/38; H04W 52/367
USPC .......... 370/318, 311, 331–334; 455/517, 522, 455/571
See application file for complete search history.

(56) References Cited

U.S. PATENT DOCUMENTS 6,741,867 B1 *  5/2004  Tetsuya ......................... 455/522
7,715,353 B2 *  5/2010  Jain ....................... H04W 28/16
                                                          370/235

(Continued)

FOREIGN PATENT DOCUMENTS

WO            9849784 A2    11/1998

*Primary Examiner* — Andrew Chriss
*Assistant Examiner* — Rasha Fayed
(74) *Attorney, Agent, or Firm* — Coats & Bennett, PLLC

(57) ABSTRACT

The present invention relates to a network node and a method in method in a network node of a wireless communications system that allow for power efficient scheduling of transmission of application data over a radio interface. According to the method, information is received (71, 72) about a power consumption profile of a transmit unit and about estimated required average output transmission power of the transmit unit for transmitting an amount of application data in a time interval. The method also includes a step of making (73) a scheduling decision, comprising a type of load distribution to be used in the time interval for transmitting the amount of application data, based on the received information. In another step (74) the scheduling decision is provided to the transmit unit as a scheduling order for transmission of the application data over the radio interface. The invention also relates to a mobile station and core network node configured to provide a network node with power consumption profile information.

22 Claims, 7 Drawing Sheets

(51) Int. Cl.
*H04W 52/26* (2009.01)
*H04W 52/36* (2009.01)
*H04W 52/44* (2009.01)
*H04W 72/12* (2009.01)

(56) References Cited

U.S. PATENT DOCUMENTS

| | | | | |
|---|---|---|---|---|
| 2002/0036998 | A1* | 3/2002 | Lomp | 370/342 |
| 2002/0165004 | A1* | 11/2002 | Chen et al. | 455/522 |
| 2005/0120250 | A1* | 6/2005 | Adachi | 713/300 |
| 2006/0252451 | A1* | 11/2006 | Cho et al. | 455/522 |
| 2006/0270433 | A1* | 11/2006 | Kelton et al. | 455/522 |
| 2007/0004466 | A1* | 1/2007 | Haartsen | H04W 52/50 455/572 |
| 2007/0087770 | A1* | 4/2007 | Gan | H04B 1/0003 455/522 |
| 2007/0155390 | A1* | 7/2007 | Kodikara Patabandi et al. | 455/450 |
| 2008/0008118 | A1* | 1/2008 | Alizadeh-Shabdiz | G01S 5/02 370/328 |
| 2008/0144493 | A1* | 6/2008 | Yeh | H04W 52/50 370/230 |
| 2008/0233885 | A1* | 9/2008 | Agahi | H03G 3/3047 455/69 |
| 2008/0310488 | A1* | 12/2008 | Godfrey | 375/219 |
| 2009/0088195 | A1* | 4/2009 | Rosa | H04W 72/1284 455/507 |
| 2009/0163155 | A1* | 6/2009 | Camuffo et al. | 455/115.1 |
| 2010/0022266 | A1* | 1/2010 | Villier | H04W 52/0232 455/522 |
| 2010/0115259 | A1* | 5/2010 | Elsila et al. | 713/100 |
| 2010/0208675 | A1* | 8/2010 | Song et al. | 370/329 |
| 2010/0273504 | A1* | 10/2010 | Bull | G01S 5/02 455/456.1 |

* cited by examiner ional impact originates. Thus energy saving in both Radio Base Station (RBS) and User Equipment (UE) of wireless communication systems are examples of activities that are given priority. In case of UE power efficiency, energy saving will also lead to longer battery life time, which is important for the end user experience.

METHODS AND ARRANGEMENTS FOR SCHEDULING BASED ON POWER CONSUMPTION

TECHNICAL FIELD

The present invention relates to power consumption in a wireless communications system, and in particular to power consumption in connection with scheduling of transmission of data in the wireless communication system.

BACKGROUND

Reducing $CO_2$-emission is a focus area in many areas of technology nowadays. This applies also to the area of telecommunications. Some telecommunications companies have set up tough goals to reduce $CO_2$-emissions considerably during the next few years. This tough goal applies to the entire product portfolio, including the use phase, where most of the indirect carbon-related impact originates. Thus energy saving in both Radio Base Station (RBS) and User Equipment (UE) of wireless communication systems are examples of activities that are given priority. In case of UE power efficiency, energy saving will also lead to longer battery life time, which is important for the end user experience.

In a radio network, the radio resources over a radio interface are generally controlled by the radio base station for both RBS to UE transmission, i.e. downlink traffic, and UE to RBS transmission, i.e. uplink traffic. Assuming a fixed bandwidth, the maximum data rate that can be provided over the radio interface is limited by the transmit power. However, the bitrate generated by most applications is below the maximum bitrate over the radio interface. The maximum output transmit power will therefore not be used at low to medium cell loads. A scheduler in a radio base station may order the transmitter, i.e. RBS in case of downlink transmission and UE in case of uplink transmission, to transmit application data e.g. immediately after reception, or to buffer the application data until maximum output power can be utilized. Thus the type of scheduling applied will impact the load distribution of the output transmission power. It is generally assumed that the total transmitted energy for transmitting the same amount of data will be more or less the same, independently of the load distribution, provided that the radio conditions between the RBS and the UE are the same. However, measurements performed on a power amplifier of an RBS and of a UE have revealed that this assumption often is false. There is thus a problem that the power consumption for transmitting a certain amount of data may vary depending on the scheduled load distribution, which may lead to poor power efficiency in certain situations.

SUMMARY

An object of the present invention is to provide means and arrangements that allow for increased power efficiency in transmission of data in a wireless communication system.

The above stated object is achieved by means of a network node, a method in a network node, a mobile station and a core network node according to the independent claims.

A basic idea of embodiments of the present invention is to make it possible to perform scheduling of transmission of application data based on information about a power consumption profile of a transmit unit.

A first embodiment of the present invention provides a network node for use in a wireless communications system. The network node comprises a scheduler for controlling transmission, by a transmit unit, of application data over a radio interface. The scheduler comprises an interface configured to receive, from a radio resource estimator, information about estimated required average output transmission power of the transmit unit for transmitting an amount of application data in a time interval. The scheduler also comprises an interface configured to receive information about a power consumption profile of the transmit unit. The power consumption profile is the power consumption of the transmit unit as a function of output transmission power. The scheduler is further provided with processing circuits configured to make a scheduling decision comprising a type of load distribution to be used in the time interval for transmitting the amount of application data based on the information about the power consumption profile and the information about the estimated required average output transmission power. The scheduler furthermore comprises an interface for providing the scheduling decision to the transmit unit as a scheduling order.

A second embodiment of the present invention provides a method in a network node of a wireless communications system for scheduling transmission of application data over a radio interface. The method comprises receiving information about a power consumption profile of a transmit unit. The method furthermore comprises receiving, from a radio resource estimator, information about estimated required average output transmission power of the transmit unit for transmitting an amount of application data in a time interval. Another step in the method is making a scheduling decision comprising a type of load distribution to be used in the time interval for transmitting the amount of application data based on the information about the power consumption profile and the information about the estimated required average output transmission power. The method also comprises providing the scheduling decision to the transmit unit as a scheduling order for the transmission of the application data over the radio interface.

A third embodiment of the present invention provides a mobile station for use in a wireless communications system. The mobile station comprises processing circuits and a transmitter, which are configured to transmit information about a power consumption profile of the transmit unit to a network node to allow for uplink scheduling based on the information about the power consumption profile.

A fourth embodiment of the present invention provides a core network node of a wireless communications system. The core network node comprises a memory unit storing a database with information about power consumption profiles of a number of different types of mobile stations. The information about the power consumption profiles is associated with IMEI, International Mobile Equipment Identity, of the respective types of mobile stations. The core network node furthermore comprises processing circuits and an interface configured to receive a request from a radio network node comprising a scheduler for controlling transmissions over a radio interface, the request including an IMEI. The processing circuits and interface are also configured to transmit the information about the power consumption profile associated with the received IMEI to the radio network node to allow for uplink scheduling based on the information about the power consumption profile.

An advantage of embodiments of the present invention is that scheduling may be based on information about the power consumption profile of a transmit unit, e.g. UE or RBS. This allows for a reduction in power consumption both relating to downlink transmissions and to uplink transmissions. Reduced power consumption may be important in order to reduce $CO_2$ emissions, but in case of uplink transmissions reduced power consumption may also improve the battery life of UEs.

Another advantage of embodiments of the invention is that they are applicable in several different types of telecommunications systems according to different standards.

Further advantages and features of embodiments of the present invention will become apparent when reading the following detailed description in conjunction with the drawings.

DETAILED DESCRIPTION

Figure 1A:
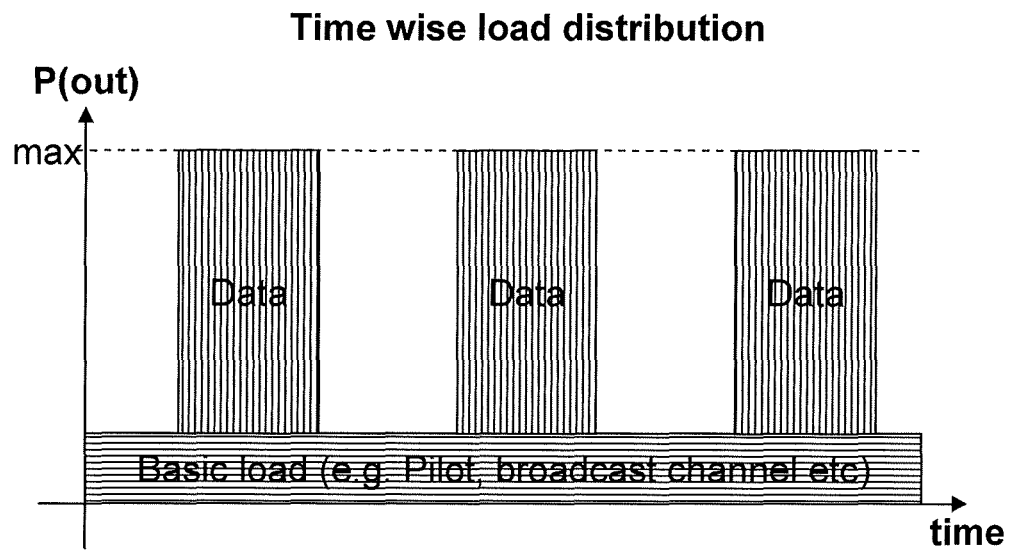
FIGS. 1a and 1b are schematic diagrams illustrating the principles of time wise load distribution and power wise load distribution respectively.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Current schedulers in mobile systems use a range of input parameters for scheduling decisions. These input parameters include data buffer sizes, channel qualities of concerned links, QoS requirements for individual data flows, etc. A typical scheduler behavior at low to medium cell load is to schedule transmission of data with a rate that directly corresponds to the arrival of data to a transmit buffer. This implies that the power of a transmitter will vary dynamically depending on the size of MAC PDUs, data packets, of each transmission time interval (TTI). Prior art schedulers do not however consider the power consumption per transmitted bit. Therefore prior art scheduling schemes may lead to unnecessarily high power consumption for transmitting a certain amount of data.

In theory, power consumption of a transmit unit as a function of output transmission power, power consumption profile, is usually assumed to be linear, i.e.

Consumed Power=Constant+$k$*Transmission Power.

Thus it is usually assumed that the total transmitted energy for transmitting an amount of data is the same independently of the load distribution. However, in reality, the power consumption as a function of transmission power is seldom linear. Measurements that have been performed on a common power amplifier of an RBS and of a UE show non-linear power consumption profiles. This implies that the power consumption will differ if the load distribution is done time wise or power wise.

In the case of time wise load distribution data is buffered and transmitted intermittently in intermittent data transmission units at a selected high output transmission power, e.g. at the maximum output transmission power. The data transmission units may e.g. be radio subframes. The principle of time wise load distribution is illustrated in FIG. 1a. In FIG. 1a a basic load, comprising e.g. pilot signals, broadcast channel etc., is illustrated as a horizontally striped area. The basic load is continuously present at a relatively low output transmission power. Application data which is buffered and transmitted intermittently at relatively high transmission power is illustrated by vertically striped areas.

Figure 1B:
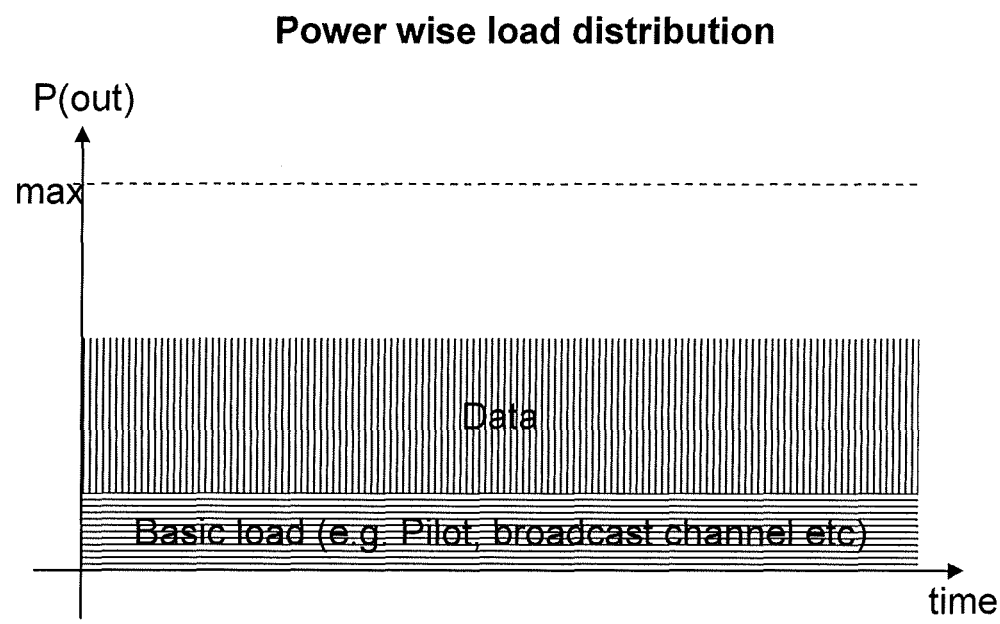

In the case of power wise load distribution data is transmitted continuously in consecutive data transmission units at a selected low power level, e.g. immediately upon reception without buffering. The consecutive data transmission units may e.g. be consecutive radio subframes. The principle of power wise load distribution is illustrated in FIG. 1b. As in FIG. 1a, the basic load is illustrated as a horizontally striped area. In addition to the basic load application data is also transmitted continuously which is illustrated by a vertically striped area.

FIGS. 1a and 1b illustrate simplified scenarios of 50% cell load. These figures are schematic simplified figures for the purpose of illustrating the principal differences between the two types of distribution. It should however be understood that in reality time wise and power wise load distribution may not be exactly as illustrated in FIG. 1a and FIG. 1b. In the case of time wise load distribution, in a real case, it is e.g. possible that the data columns illustrated in FIG. 1a vary in height, i.e. output transmission power P(out) is not always at maximum level during data transmission. In the case of power wise load distribution in a real case it is e.g. unlikely that the output transmission power is exactly the same over time as illustrated in FIG. 1b. The important differences in principle between time wise and power wise load distribution is however that in the case of time wise load distribution data is transmitted intermittently at higher power, while in the case of power wise load distribution data is transmitted continuously, i.e. every TTI, at lower power. The term "selected high output transmission power" will be used herein to refer to the selected output transmission power in the case of time wise load distribution, since it is usually at the maximum level or at least at a high level compared to the output transmission power in the case of power wise load distribution. The term "selected low output transmission power" will be used herein to refer to the selected output transmission power in the case of power wise load distribution, since it is usually at a level below the maximum level and at a low level compared to the output transmission power in the case of time wise load distribution.

Figure 2A:
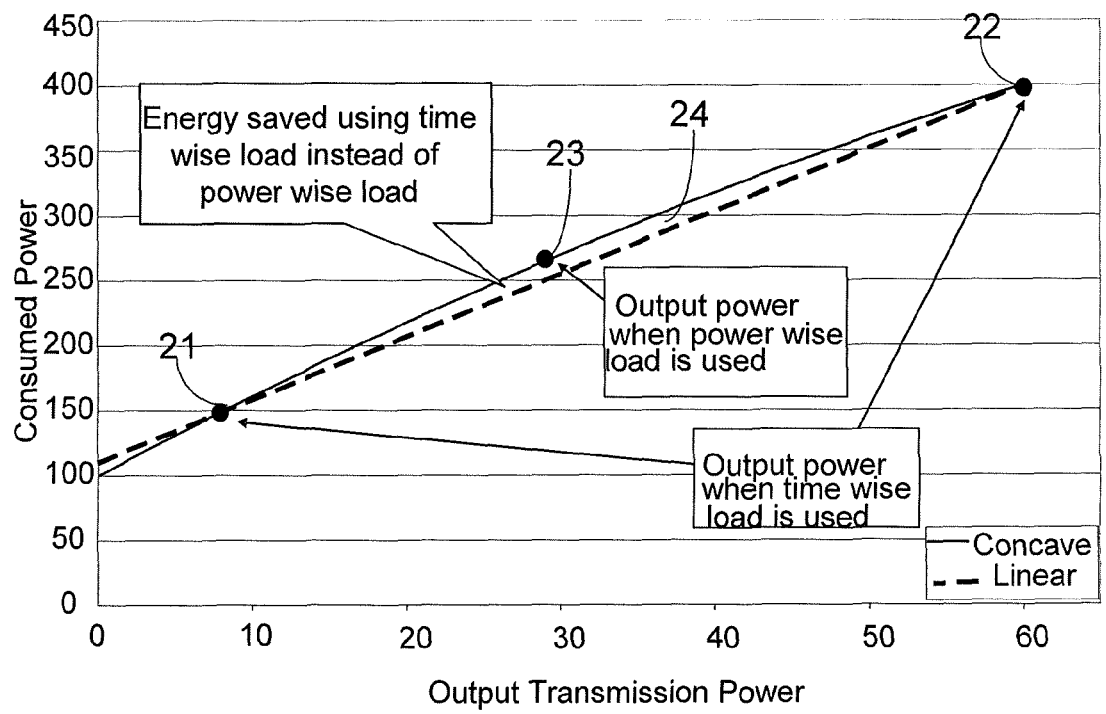
FIGS. 2a and FIG. 2b are schematic diagrams illustrating energy savings that are made possible by using embodiments of the present invention in case of different power consumption profiles.
Figure 2B:
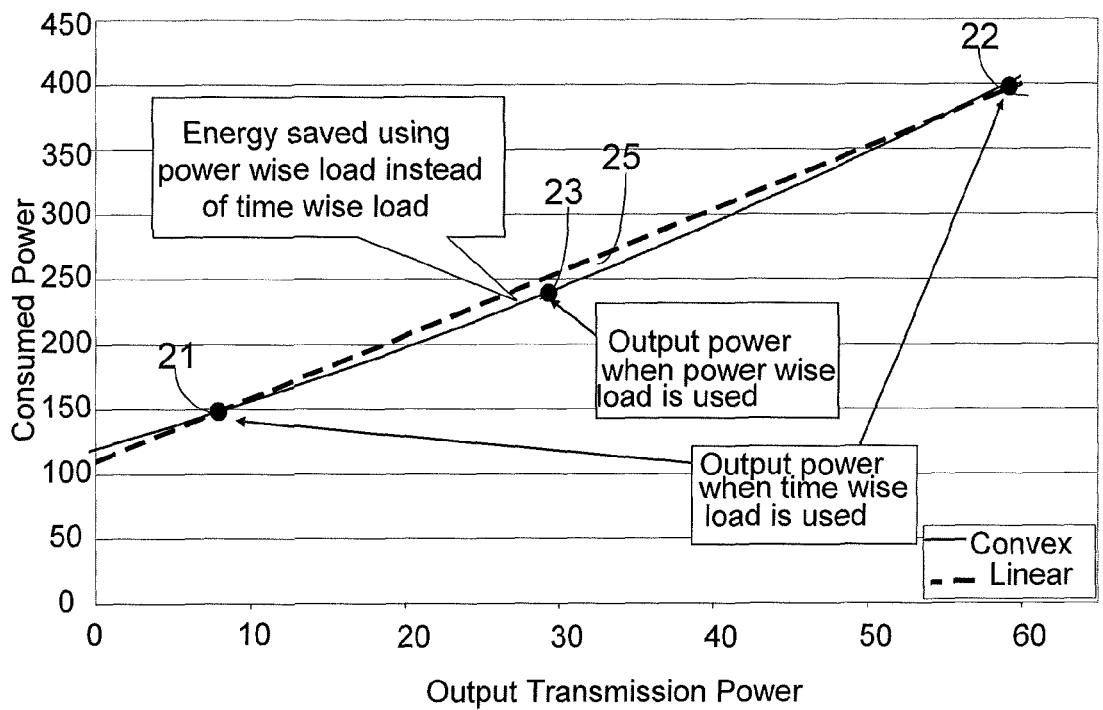

Theoretical calculations show that when the power consumption profile is a concave function in an interval, i.e. the function lies above the straight line segment connecting two points on the function, for any two points in the interval, it would be desirable to distribute the load time wise, i.e. using a high-low transmit pattern, and if the power consumption profile is a convex function in an interval, i.e. the function lies below the straight line segment connecting two points on the function, for any two points in the interval, it would be desirable to distribute the load power wise, i.e. using an average output transmission power that is constant or at least more leveled out than the time wise load distribution. This is illustrated in FIGS. 2a and 2b. FIG. 2a illustrates a concave power consumption profile and FIG. 2b illustrates a convex power consumption profile. If a time wise load distribution as illustrated in FIG. 1a is used, the output transmission power is either at the level of the basic load indicated by point 21 in FIGS. 2a and 2b, or at the maximum output transmission power indicated by point 22 in FIGS. 2a and 2b. If a power wise load distribution as illustrated in FIG. 1b is used, the output transmission power is continuously at a level indicated by point 23 in FIGS. 2a and 2b. The average consumed power in the case of the time wise load distribution then becomes a point on the straight line segment connecting points 21 and 22. In the case of the power wise load distribution the average consumed power is at the level indicated by point 23. Thus energy savings with respect to consumed power can be made by choosing an appropriate type of load distribution in view of the appearance of the power consumption profile. Such possible energy savings are illustrated schematically by areas 24 and 25 in FIGS. 2a and 2b respectively.

Figure 3A:
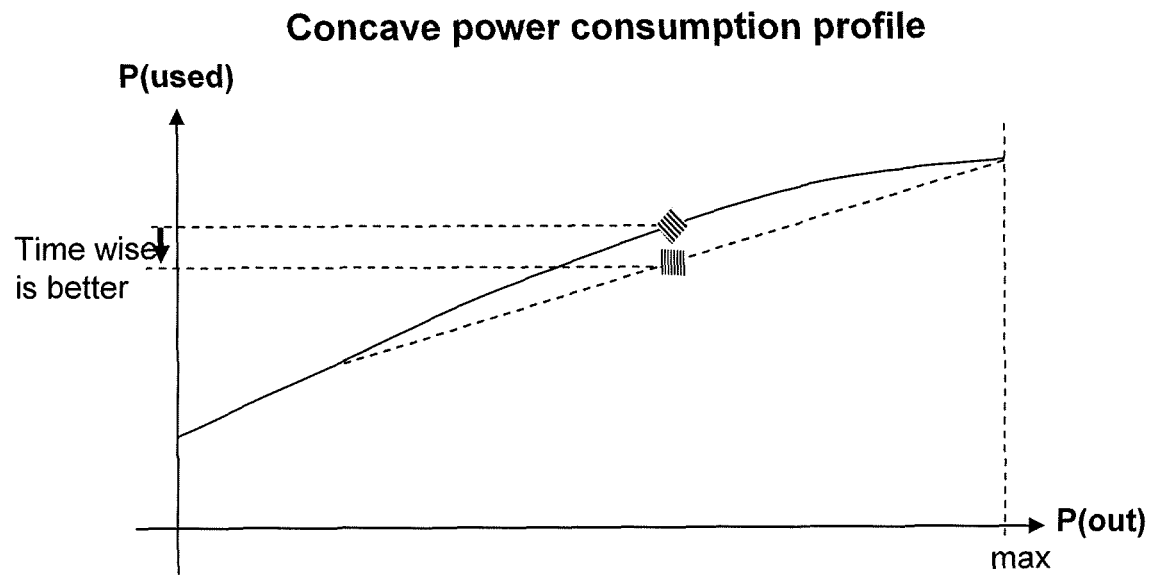
FIGS. 3a and FIG. 3b are schematic diagrams comparing scheduling according to a power wise load distribution with scheduling according to a time wise load distribution in terms of consumed power for a case of a concave power consumption profile and for a case of a convex power consumption profile.
Figure 3B:
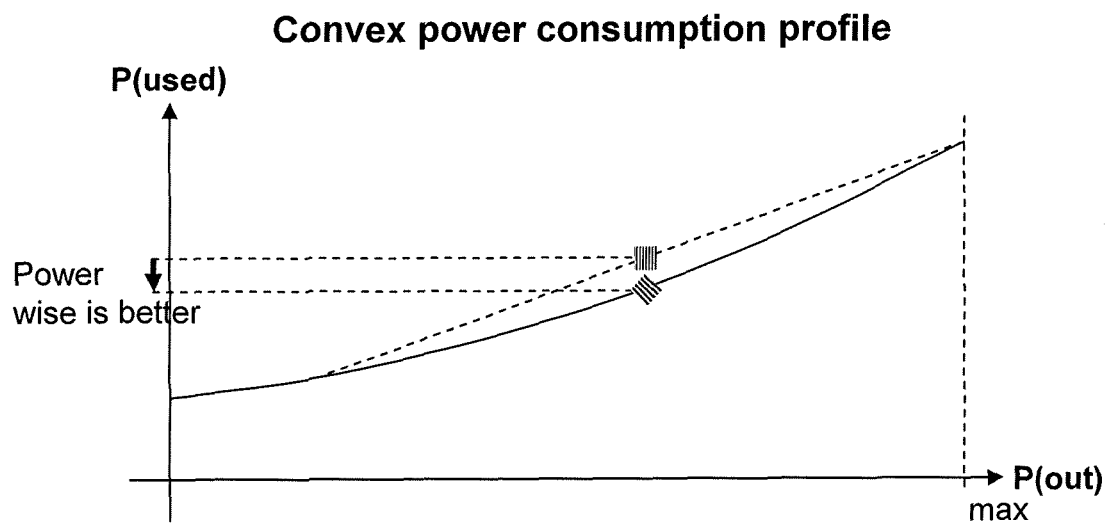

FIG. 3a illustrates that if the power consumption profile is concave, time wise load distribution is better from the perspective of keeping power consumption P(used) down. The dashed symbols illustrate the average consumed power in case of power wise load distribution (upper, diagonally striped symbol) and time wise load distribution (lower, vertically striped symbol). FIG. 3b illustrates that if the power consumption profile is convex, power wise load distribution is better from the perspective of keeping power consumption down. As, in FIG. 3a, the dashed symbols illustrate the average consumed power in case of time wise load distribution (upper, vertically striped symbol) and power wise load distribution (lower, diagonally striped symbol). Accordingly, FIGS. 2a, 2b, 3a and 3b illustrate that it is possible to save energy by scheduling application data according to the power consumption profile of a transmit unit, e.g. a UE or a RBS.

Thus according to an embodiment of the present invention a downlink scheduler uses information about the RBS power consumption profile as input for a scheduling decision, in order to decrease the power consumption of the RBS. According to another embodiment an uplink scheduler in the RBS uses information about the UE power consumption profile as input for a scheduling decision, in order to decrease the power consumption of the UE. According to further embodiments, methods and arrangements are provided to facilitate in providing the RBS with information about power consumption profiles of uplink or downlink transmit units.

According to embodiments of the present invention the UE and RBS provide their power consumption profiles, or at least information relating to their power consumption profiles, to the RBS schedulers. The power consumption profile may include typical transmission power values and the corresponding power consumption. The provisioning of the RBS power consumption profile could be handled internally in the RBS. It could be e.g. hardcoded in scheduler software, hardcoded in power amplifier software and distributed to the scheduler software via a Common Public Radio Interface (CPRI) interface, measured during start up of the RBS, etc.

The provisioning of the UE power consumption profile may be handled by transmission over the radio interface. This should be standardized in 3GPP due to multi-vendor interoperability between the RBS and the UE. It can be standardized by e.g. specifying different UE classes for different power profiles. In order not to reveal the energy consumption characteristics of the transmit unit over an open interface, the power consumption profile information can be narrowed down to a degree that the scheduler in the RBS can determine what type of load distribution is preferred during different required average output transmission power. The power consumption profile information can e.g. be an indication of whether the power consumption profile is convex or concave for different intervals of output transmission power.

It is possible that the power consumption profile of a transmit unit is convex in some intervals of output transmission power and concave in other intervals of output transmission power. Therefore, embodiments of the present invention first estimates a required average output transmission power in a time interval which provides an indication of an interval of the power consumption profile that is of interest so that it can be determined if the power consumption profile is convex or concave in the interval of interest.

Thus it is possible according to different embodiments of the present invention to provide a scheduler with more or less detailed information regarding the power consumption profile of a transmit unit, e.g. UE or RBS, so that the scheduler is able to determine which load distribution is preferred from the view point of keeping power consumption down.

When referring herein to the power consumption profile of a transmit unit it is possible that the power consumption profile is based on the power consumption of the entire transmit unit or on parts of the transmit unit that are considered relevant, such as a transmit power amplifier (PA). The parts of a transmit unit that are considered relevant with respect to power consumption may vary between different types of transmit units and may also depend on the application scenario, different design requirements etc.

Figure 4A:
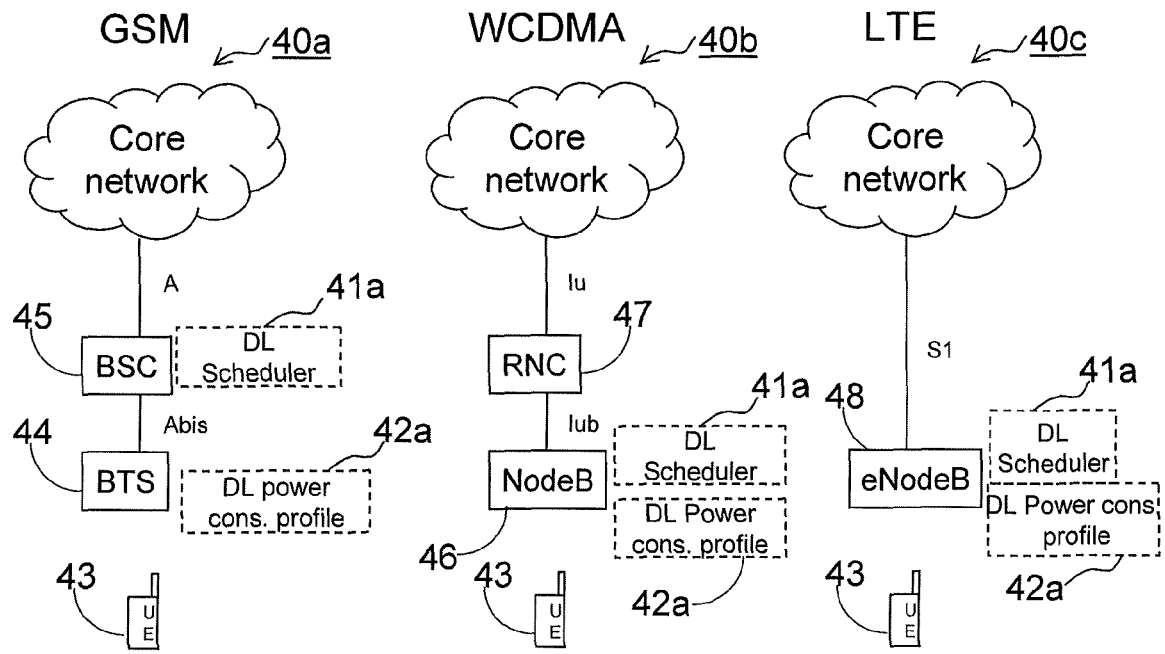
FIG. 4a is schematic block diagram illustrating implementation of embodiments of the present invention for downlink transmission in different types of telecommunications systems.

FIG. 4a illustrates the location of a downlink (DL) scheduler 41a and the transmit unit that a DL power consumption profile 42a is associated with in telecommunication systems according to different standards. In a GSM system 40a, the DL scheduler 41a is located in a BSC (Base Station Controller) 45 and the DL power consumption profile 42a relates to a BTS (Base Transceiver Station) 44. In a WCDMA (Wideband Code Division Multiple Access) system 40b the DL scheduler 41a for HSDPA is located in a NodeB 46 and the DL power consumption profile 42a is associated with the NodeB 46. In a LTE (Long Term Evolution) system 40c DL scheduler 41a is located in an eNodeB 48 and the DL power consumption profile 42a is associated with the eNodeB 48. If the DL power consumption profile 42a relates to another node than the one comprising the DL scheduler 41a, as in the GSM system 40a, it will be necessary to provide communication between nodes in order to provide the DL scheduler with information relating to the DL power consumption profile. Such communication may be achieved by making use of existing interfaces, e.g. the Abis interface in case of the GSM system 40a.

Figure 4B:
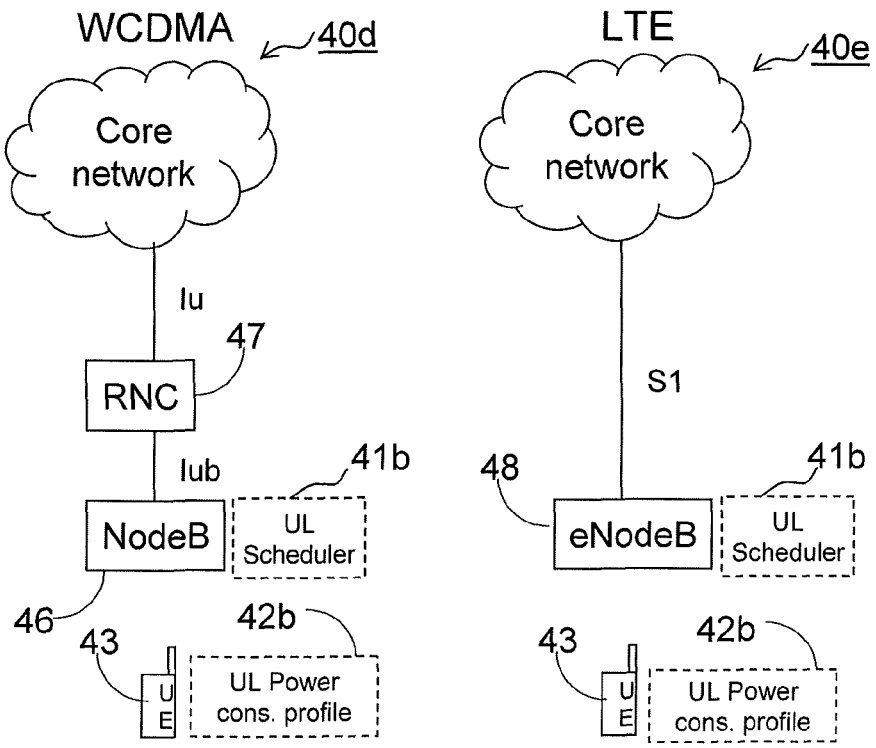
FIG. 4b is schematic block diagram illustrating implementation of embodiments of the present invention for uplink transmission in different types of telecommunications systems.

FIG. 4b illustrates the location of an uplink (UL) scheduler 41b and transmit unit 43 that an UL power consumption profile 42b is associated with in telecommunication systems according to different standards. The UL power consumption profile 42*b* relates to a UE 43 while the UL scheduler 41*b* for Enhanced UL (E-UL) is located in a network node, the NodeB 46 in a WCDMA system 40*d* and the eNodeB 48 in a LTE system 40*e*. According to the embodiments described above, the UL scheduler 41*b* is provided with information relating to the UL power consumption profile 42*b*. This may be achieved by means of the UE 43 transmitting this information directly to the node comprising the UL scheduler 41*b*. An alternative is that the UL scheduler receives the information regarding the UL power consumption profile via a core network node. A core network node may e.g. be adapted to store and/or keep information in a database comprising information regarding the power consumption profiles of different types of user equipment e.g. a look up table based on International Mobile Equipment Identity (IMEI). An advantage of communication via the core network is that little or no modification of the user equipment may be required for providing the scheduler with information regarding the UL power consumption profile.

Figure 6:
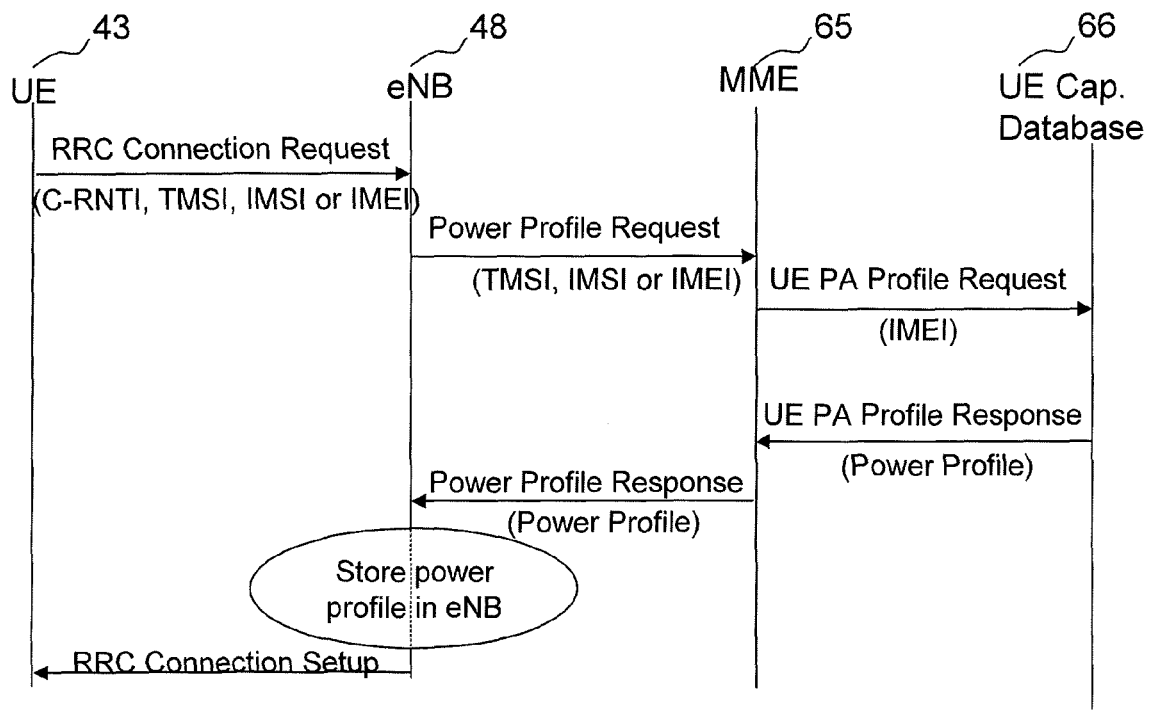
FIG. 6 is a signaling diagram illustrating an embodiment of the present invention.

FIG. 6 illustrates a signaling diagram according to an exemplary LTE embodiment involving a UE Capacity Database 66 stored in a core network node. The UE 43 transmits a RRC Connection Request, comprising information by which the type of UE may be directly or indirectly identified such as Cell Radio Network Temporary Identifier (C-RNTI), Temporary Mobile Subscriber Identifier (TMSI), International Mobile Subscriber Identifier (IMSI) or IMEI, to the eNodeB 48. In response, the eNodeB sends a Power Profile Request, including e.g. the TMSI, IMSI or IMEI associated with the UE 43 to the MME 65 (Mobility Management Entity) in the core network, which in turn may transmit a request UE PA Profile Request including the IMEI of the UE 43 to the UE Capacity Database 66 located somewhere in the core network. The UE Capacity Database may store information regarding several different types of UEs sorted by IMEI, wherein information regarding power consumption profile may be one of many different types of information stored in the database. The UE Capacity Database 66 may send a UE PA Profile Response including power consumption profile information to the MME 65, which forwards the power consumption profile information to the eNodeB in a Power Profile Response message. The eNodeB would then generally store the power consumption profile information as long as the UE is active in the cell of the eNodeB. The eNodeB 48 sends a RRC Connection Setup message to the UE 43 after having received the power consumption profile information associated with the UE.

Therefore, in order to facilitate providing the UL scheduler with information regarding the UL power consumption profile to allow for scheduling decisions based on the information regarding the UL power consumption profile, the UE may be adapted with processing circuits and a transmitter which are configured to transmit information about the UL power consumption profile to a network node according to an embodiment of the present invention. According to an alternative embodiment a core network node is provided with a memory unit storing a database with information about power consumption profiles of a number of different types of UEs and configured to extract stored information regarding a power consumption profile upon request as described above.

Thus by providing the scheduler with information regarding the power consumption profile it is possible for the scheduler to consider this information when making scheduling decisions. It should however be noted that there may be cases when it is desirable to choose one type of load distribution from the view point of keeping power consumption down, while there are other requirements that dictate the use of another load distribution. Furthermore, it should be noted that when the load is so high that the transmit unit is required to continuously transmit at maximum output transmission power, it is not relevant for the scheduler to choose a type of load distribution. However, making the scheduler aware of the preferred load distribution in view of power consumption will certainly improve the possibilities of keeping power consumption down by choosing the most power efficient load distribution. According to different embodiments the scheduler may be adapted to choose the load distribution that provides the lowest power consumption at a given estimated required average output transmission power, or the scheduler may be adapted to make a decision regarding load distribution based on several different weighted decision parameters where the power consumption profile, or simplified information relating to the power consumption profile, is one such decision parameter.

In case of downlink scheduling it is possible for the scheduler to choose to apply different types of load distribution for different UEs or groups of UEs, i.e. time wise load distribution may be used for transmission to some UEs, while power wise load distribution is chosen for other UEs. The selection of appropriate load distributions for downlink transmission to different UEs may e.g. be based on different demands for quality of service (QoS), different priorities in keeping power consumption down and different power consumption profiles.

For LTE, power wise load distribution can be realized by allocating only part of the maximum number of Physical Resource Blocks (PRB) on every Transmission Time Interval (TTI) for data transmission. Time wise load distribution can be realized by allocating, in some TTI:s, all the PRB:s for data transmission, whereas in the remaining TTI:s, allocating no PRB:s at all.

For WCDMA HSDPA, power wise load distribution can e.g. be realized by allocating only part of the maximum number of downlink channelization codes for HDSPA traffic on every TTI. Time wise load distribution can e.g. be realized by allocating, in some TTI:s, all the channelization codes for data transmission, whereas in the remaining TTI:s, allocating no channelization code at all. This embodiment assumes that the downlink scheduler allocates the same amount of power on each code.

For GSM, power wise load distribution can e.g. be realized by allocating only part of the carrier frequency of the maximum number of carriers within a transmission group (TG) for all time slots (TS). Time wise load distribution can e.g. be realized by allocating, in some time slots, the maximum number of carriers carriers for data transmission, whereas, in the remaining time slots, allocating a minimum number of carriers.

It is apparent to the person skilled in the art that there are other methods of realizing power wise and time wise load distribution in LTE, WCDMA and GSM systems respectively than the examples mentioned above.

Figure 7:
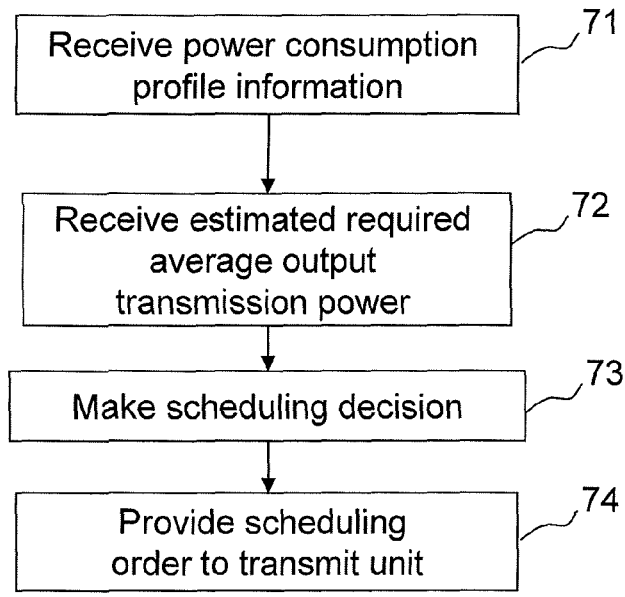
FIG. 7 is a flow diagram of a method according to an embodiment of the present invention.

FIG. 7 is a flow diagram illustrating a method in a network node for scheduling transmission of data according to an embodiment of the present invention. The method is applicable both to an uplink and to a downlink scenario. In a step 71 information regarding a power consumption profile of a transmit unit is received. In a step 72 an estimated required average output transmission power of the transmit unit for transmitting an amount of application data in a time interval is received. The time interval may for instance relate to a radio frame or a number of TTIs for which it is of interest to choose a type of load distribution. Based on the estimated required average output transmission power and the information regarding the power consumption profile, a scheduling decision is made in a step 73, which includes a decision on the type of load distribution to be used in the time interval. In a step 74 a scheduling order corresponding to the scheduling decision is provided to the transmit unit.

Figure 8:
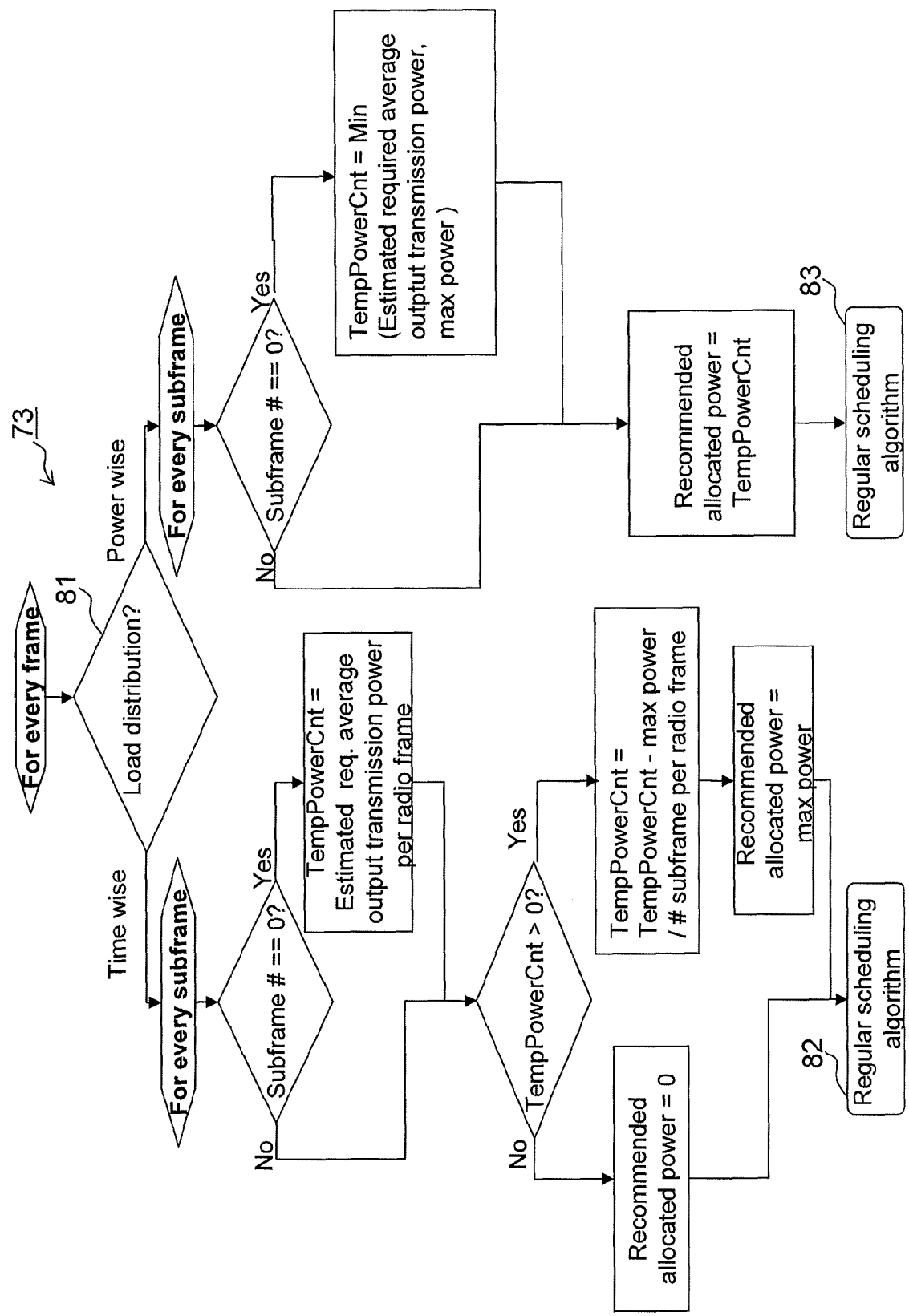
FIG. 8 is a flow diagram illustrating a part of a method according to an embodiment of the present invention.

There are many alternative options for performing the step 73 and making the scheduling decision based on the information about the power consumption profile. One such option is illustrated in the flow diagram of FIG. 8. According to the illustrated option a decision about whether to use time wise or power wise load distribution is made on a per frame basis, based on the estimated required average output transmission power and the information about the power consumption profile, step 81. Thereafter a recommended output transmission power is determined for the chosen type of load distribution on a per subframe basis. In LTE a radio frame includes 10 subframes, while in WCDMA a radio frame includes 5 subframes. In this example, assume that the following data applies in a WCDMA system having 5 subframes per radio frame:
maximum output transmission power, denoted max power allocation in FIG. 8, is 40 W estimated required average output transmission power, denoted estimated req average power allocation per radio frame in FIG. 8, is 10 W.

For a case where time wise load distribution is selected the algorithm will then give the result that recommended allocated power, i.e. recommended output transmission power, for subframes number 0 and 1 will be max power allocation=40 W, while for the remaining subframes 2, 3 and 4 of a radio frame, the recommended allocated power will be 0, i.e. no transmission is recommended during these subframes, implying that any data remaining or arriving for transmission during this interval will have to wait until the next radio frame.

For a case where power wise load distribution is selected the algorithm will give the result that recommended allocated power for each subframe is the minimum of estimated required average power allocation per radio frame and max power allocation. In this example recommended allocated power, i e recommended output transmission power, for all subframes of the radio frame will be 10 W, i.e. transmission power will be evenly distributed throughout the radio frame.

The above described algorithms for determining recommended allocated power in cases where time wise or power wise load distribution is selected are merely examples of algorithms. The algorithm that is used is a matter of implementation choice and there are many other more or less sophisticated algorithms that may used, as will be apparent to the person skilled in the art.

Since there may be other criteria that influence scheduling than the desire to keep power consumption low, it is possible that the chosen type of load distribution and recommended output transmission power is not applied. This possible consideration of other criteria for scheduling is illustrated in FIG. 8 by steps 82 and 83 referring to a regular scheduling algorithm.

Figure 5:
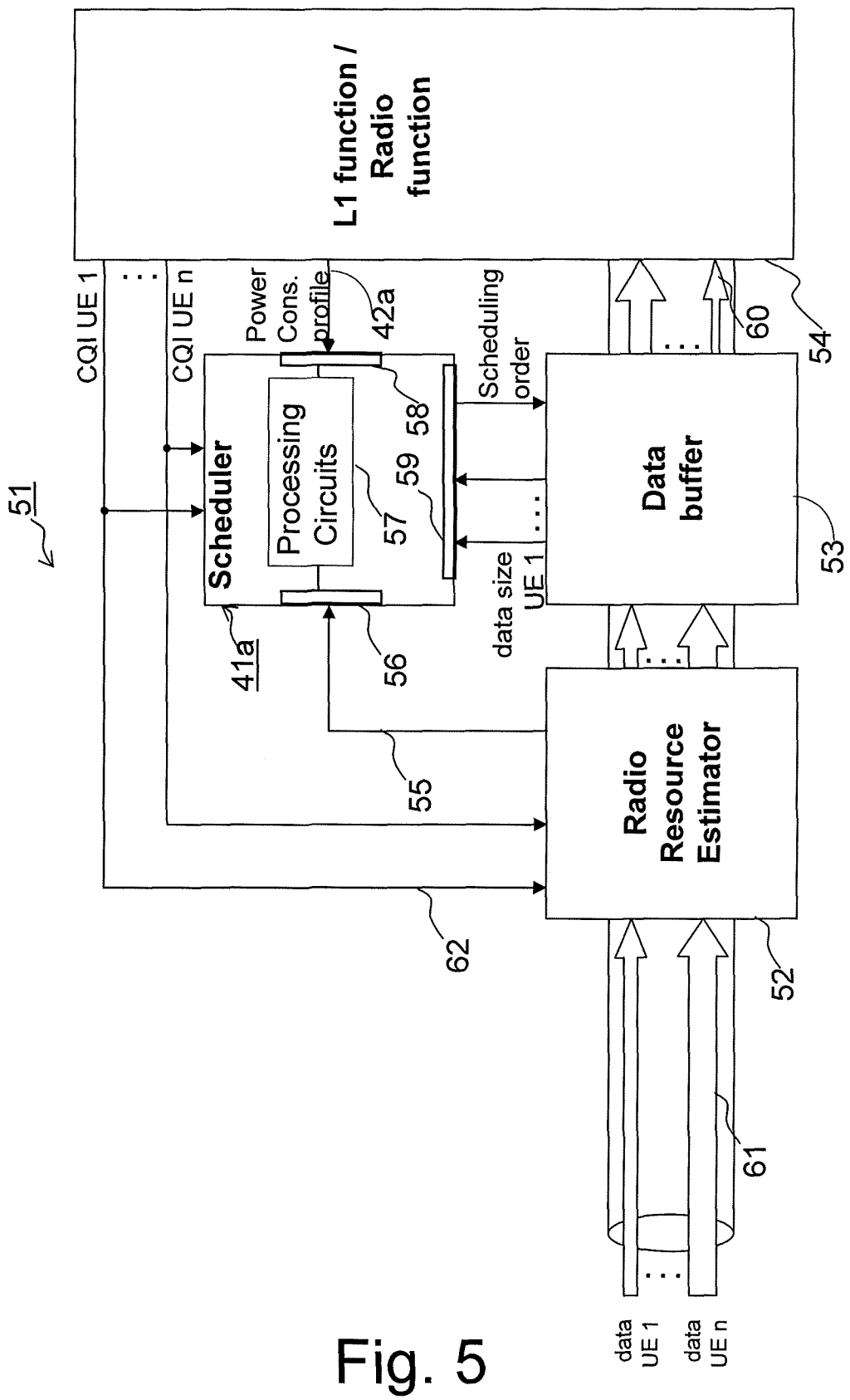
FIG. 5 is a schematic block diagram illustrating implementation of an embodiment of the present invention in a network node.

The method illustrated by FIG. 7 and FIG. 8, in case of downlink transmission, may be carried out in a network node 51 as illustrated in FIG. 5. FIG. 5 is a schematic block diagram of an embodiment of the present invention. In order to provide a simple and clear presentation only those parts of the network node 51 which are considered relevant for the understanding of the present invention in the case of a downlink scenario are shown. The network node 51 of FIG. 5 is an RBS that comprises a scheduler 41a, which is a DL scheduler. The network node also comprises a radio resource estimator 52, a data buffer 53 and a L1 function/Radio function illustrated as a unit 54. The radio resource estimator 52 is configured to receive application data 61 to be transmitted to a number of different UEs, UE1, . . . , UEn. The radio resource estimator is furthermore configured to receive Channel Quality Information (CQI) reports 62 relating to the channel quality of the radio channels for the different UEs. Based on this information about the application data 61 to be transmitted and the CQI 62, the radio resource estimator 52 estimates the required average output transmission power per radio frame for transmitting the application data 61 and reports information 55 about the estimated required average output transmission power to the scheduler 41a. The application data 61 is buffered in the data buffer 53 until it is scheduled for transmission. Operations and implementation of radio resource estimators and data buffers are well known to a person skilled in the art.

The scheduler 41a comprises an interface 56 configured to receive the information 55 about estimated required average output transmission power from the radio resource estimator and an interface 59 to the data buffer over which information about the size of buffered data to different UEs and scheduling orders may be exchanged. The scheduler 41a is furthermore provided with an interface 58, which is configured to receive information about the power consumption profile 42a of the transmit unit that is to transmit the application data 61. In this example, the power consumption profile 42a is the power consumption profile associated with the RBS 51 itself. In an uplink scenario the scheduler would however be configured to receive information about power consumption profiles of a number of UEs respectively. Processing circuits 57 of the scheduler are configured to make a scheduling decision based on received information about the power consumption profile and about the estimated required average output transmission power. This scheduling decision includes a decision on the type of load distribution to be used for transmitting the application data 61. If the power consumption profile 42a is a convex function in an interval including the estimated required average output transmission power, it is preferred from the viewpoint of saving power, that the load distribution is determined to be a power wise load distribution. If the power consumption profile 42a is a concave function in an interval including the estimated required average output transmission power, it is preferred from the viewpoint of saving power, that the load distribution is determined to be a time wise load distribution. The scheduling decision results in a scheduling order to the transmit unit concerned. In this example the scheduling order is an internal order within the RBS 51, but in an uplink scenario the scheduling order will be communicated to the concerned UE. In FIG. 5 scheduled application data which is being transferred from the data buffer 53 to the L1 function/radio function 54 for transmission is indicated by reference numeral 60.

The above description of FIG. 5 focuses on functional parts of a network node involved in downlink scheduling. In case of uplink scheduling the scheduler 41a is replaced by an uplink scheduler, and the functions of the data buffer 53 and the radio resource estimator 54 would generally be performed in the UE, such that the uplink scheduler would receive input for its scheduling decision from another node than the network node that the scheduler is incorporated in.

As will be apparent to a person skilled in the art different components of the network node 51 may be realized by means of software, hardware, firmware or combinations thereof. It will furthermore be apparent to the person skilled in the art that although parts of the network node 51 are illustrated as separate units or circuits in FIG. 5 it is also possible for several parts to be physically integrated.

From the above description it is apparent that an advantage of embodiments of the present invention is that they allow for a reduction of power consumption by means of power efficient scheduling of transmission of application data. The power efficient scheduling is made possible by providing information about the power consumption profile of the concerned transmit unit as input to the scheduler. The scheduler may thus base scheduling decisions on this information about the power consumption profile, and choose to apply the most power efficient load distribution for transmission of the application data. Depending on the power consumption profile it is sometimes e.g. most power efficient to buffer data and transmit intermittently at maximum output transmission power, while it in other cases is more power efficient to transmit continuously at a lower output transmission power, as described above. To give an idea of the possible power gain associated with more power efficient scheduling, it can be mentioned that calculations based on an available RBS power amplifier with a concave power consumption profile have shown that the power gain realized by applying a time wise load distribution instead of a power wise load distribution can be up to 4.8%, or up to around 10 W in absolute terms for the considered RBS power amplifier.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A network node for use in a wireless communications system comprising:
a scheduler for controlling transmission, by a transmit unit, of application data over a radio interface;
wherein the scheduler comprises:
a first interface configured to receive, from a radio resource estimator, information about estimated required average output transmission power of the transmit unit for transmitting an amount of application data in a time interval;
a second interface configured to receive information about a power consumption profile of the transmit unit, wherein the power consumption profile is the power consumption of the transmit unit as a function of output transmission power;
processing circuits configured to make a scheduling decision comprising a type of load distribution to be used in the time interval for transmitting the amount of application data based on the information about the power consumption profile and the information about the estimated required average output transmission power, the scheduling decision being such that, in response to the power consumption profile being a convex function in an interval including the estimated required average output transmission power, the load distribution to be used is a power wise load distribution according to which the amount of application data is transmitted continuously in the time interval in consecutive data transmission units at a selected low transmission power level;
a third interface for providing the scheduling decision to the transmit unit as a scheduling order.

2. The network node of claim 1, wherein the selected low transmission power level is less than the maximum output transmission power of the transmit unit.

3. The network node of claim 1, wherein the processing circuits of the scheduler are configured to decide, in response to the power consumption profile being a concave function in an interval including the estimated required average output transmission power, that the load distribution to be used is a time wise load distribution according to which the amount of application data is transmitted intermittently in the time interval in intermittent data transmission units at a selected high transmission power level.

4. The network node of claim 3:
wherein the selected high transmission power level is substantially equal to the maximum output transmission power level of the transmit unit;
wherein the time wise load distribution causes the amount of application data to be transmitted intermittently such that no application data is transmitted at some subintervals of the time interval and the high transmission power level is used in other subintervals of the time interval.

5. The network node of claim 1, wherein the scheduler is an uplink scheduler for controlling uplink transmission and the transmit unit is a mobile station.

6. The network node of claim 1, wherein the scheduler is a downlink scheduler for controlling downlink transmission.

7. The network node of claim 6, wherein network node is a radio base station comprising the transmit unit.

8. The network node of claim 1, wherein the network node further comprises:
a fourth external interface configured to communicate with another node to receive the information about the power consumption profile;
a memory unit configured to at least temporarily store the information about the power consumption profile.

9. The network node of claim 1, wherein the information about the power consumption profile is a specification of a function defining the power consumption profile.

10. The network node of claim 1, wherein the information about the power consumption profile is an indication of whether the power consumption profile is a convex or concave function for different intervals of output transmission power.

11. A method in a network node of a wireless communications system for scheduling transmission of application data over a radio interface, the method comprising:
receiving information about a power consumption profile of a transmit unit, wherein the power consumption profile is the power consumption of the transmit unit as a function of output transmission power;
receiving, from a radio resource estimator, information about estimated required average output transmission power of the transmit unit for transmitting an amount of application data in a time interval;
making a scheduling decision, comprising a type of load distribution to be used in the time interval for transmitting the amount of application data, based on the information about the power consumption profile and the information about the estimated required average output transmission power, the scheduling decision being such that, in response to the power consumption profile being a convex function in an interval including the estimated required average output transmission power, the load distribution to be used is a power wise load distribution according to which the amount of application data is transmitted continuously in the time interval in consecutive data transmission units at a selected low transmission power level;
providing the scheduling decision to the transmit unit as a scheduling order for transmission of the application data over the radio interface.

12. The method of claim 11, wherein the selected low transmission power level is less than the maximum output transmission power of the transmit unit.

13. The method of claim 11, wherein the making the scheduling decision comprises deciding, in response to the power consumption profile being a concave function in an interval including the estimated required average output transmission power, that the load distribution to be used is a time wise load distribution, according to which the amount of application data is transmitted intermittently in the time interval in intermittent data transmission units at a selected high transmission power level.

14. The method of claim 13:
wherein the selected high transmission power level is substantially equal to the maximum output transmission power level of the transmit unit;
wherein the time wise load distribution causes the amount of application data to be transmitted intermittently such that no application data is transmitted at some subintervals of the time interval while the high transmission power level is used in other subintervals of the time interval.

15. The method of claim 11, wherein the transmit unit is a mobile station that is scheduled to transmit the application data in an uplink transmission.

16. The method of claim 11, wherein the transmit unit is scheduled to transmit the application data in a downlink transmission.

17. The method of claim 16, wherein the network node is a radio base station comprising the transmit unit.

18. The method of claim 11, further comprising:
communicating with another node to receive the information about the power consumption profile;
at least temporarily storing the information about the power consumption profile in a memory.

19. The method of claim 11, wherein the information about the power consumption profile is a specification of a function defining the power consumption profile.

20. The method of claim 11, wherein the information about the power consumption profile is an indication of whether the power consumption profile is a convex or concave function for different intervals of output transmission power.

21. A mobile station for use in a wireless communications system, the mobile station comprising:
processing circuits;
a transmitter, operatively connected to the processing circuits, and configured to transmit, to a network node, information about a power consumption profile of the mobile station that enables the network node to:
make a determination of whether the power consumption profile corresponds to a convex function or concave function for at least one interval of output transmission power; and
perform uplink scheduling based on the determination;
wherein the power consumption profile is the power consumption of the mobile station as a function of output transmission power;
wherein the information about the power consumption profile is an indication of whether the power consumption profile is a convex or concave function for different intervals of output transmission power.

22. A core network node of a wireless communications system, which core network node comprises:
a memory storing a database with information about power consumption profiles of a number of different types of mobile stations, wherein a power consumption profile is the power consumption of a mobile station as a function of output transmission power, wherein the information about the power consumption profiles is:
associated with International Mobile Equipment Identity (IMEI) of the respective types of mobile stations; and
an indication of whether the power consumption profile is a convex or concave function for different intervals of output transmission power;
processing circuits and an interface configured to:
receive a request from a radio network node comprising a scheduler for controlling transmissions over a radio interface, the request including an IMEI;
transmit the information about the power consumption profile associated with the received IMEI to the radio network node to allow for uplink scheduling based on the information about the power consumption profile.

* * * * *

UNITED STATES PATENT AND TRADEMARK OFFICE
CERTIFICATE OF CORRECTION

PATENT NO. : 9,265,013 B2  
APPLICATION NO. : 13/502848  
DATED : February 16, 2016  
INVENTOR(S) : Zee et al.

Page 1 of 1

It is certified that error appears in the above-identified patent and that said Letters Patent is hereby corrected as shown below:

In the Specification

In Column 3, Line 27, delete "is schematic" and insert -- is a schematic --, therefor.

In Column 3, Line 31, delete "is schematic" and insert -- is a schematic --, therefor.

Signed and Sealed this  
Twenty-third Day of August, 2016

Michelle K. Lee  
*Director of the United States Patent and Trademark Office*